United States Patent [19]

Trent

[11] Patent Number: 5,413,369

[45] Date of Patent: May 9, 1995

[54] LATCH MECHANISM FOR TRACTOR HITCHES, FARM GATES OR THE LIKE

[76] Inventor: Billy E. Trent, Rte. 1, Box 706, Rose Hill, Va. 24281

[21] Appl. No.: 232,669

[22] Filed: Apr. 25, 1994

[51] Int. Cl.$^6$ .............................. B60D 1/02; E05C 1/04
[52] U.S. Cl. .................................... 280/477; 280/508; 292/DIG. 12; 292/140; 292/165
[58] Field of Search .................... 280/477, 478.1, 492, 280/504, 508, 510, 515, 509; 292/165, 173, 140, 146, DIG. 12

[56] References Cited

U.S. PATENT DOCUMENTS

| | | | |
|---|---|---|---|
| 2,478,736 | 8/1949 | Balzer | 280/477 |
| 2,556,748 | 6/1951 | Buckley | 280/477 |
| 2,671,673 | 3/1954 | Benson | 280/477 |
| 2,844,390 | 7/1958 | Smith | 280/477 |
| 3,495,851 | 2/1970 | July | 280/510 |
| 3,912,302 | 10/1975 | Patterson | 280/477 |
| 4,560,184 | 12/1985 | Williams, Jr. | 280/477 X |
| 4,666,177 | 5/1987 | Vinchattle | 280/477 X |
| 4,811,965 | 3/1989 | Eubanks | 280/477 X |
| 4,844,497 | 7/1989 | Allen | 280/477 |
| 4,998,745 | 3/1991 | David | 280/508 |

*Primary Examiner*—Margaret A. Focarino
*Assistant Examiner*—F. Zeender

[57] ABSTRACT

A latching device to be employed on farm tractor hitches or on large swinging gates or the like, wherein camming structure is provided for actuating a latch bolt, and wherein the camming structure is in the form of a downward, angled slot in a cylinder wall, and a camming arm extending out through the slot, whereby initial rotation of the arm will allow the bolt to move downwardly in the cylinder to a latching position extending through aligned apertures in the structures being latched together.

8 Claims, 1 Drawing Sheet

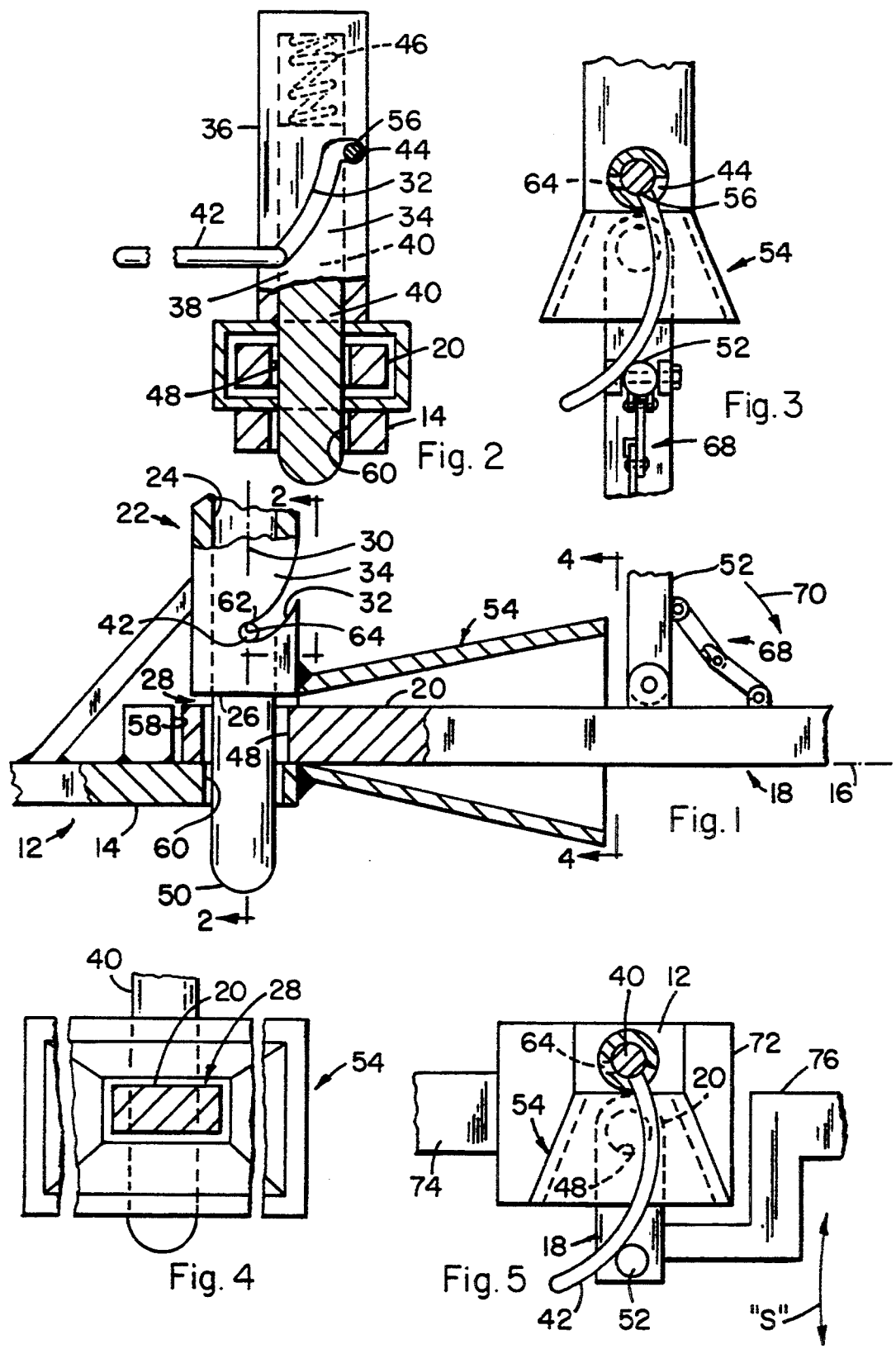

5,413,369

LATCH MECHANISM FOR TRACTOR HITCHES, FARM GATES OR THE LIKE

FIELD OF THE INVENTION

This invention concerns a mechanism for facilitating the connection of a tractor or other motorized vehicle to equipment to be towed such as trailers or farm implements, or for use on gates or other closure devices, particularly those of substantial size and weight as employed on farms or in industry.

BACKGROUND OF THE INVENTION

In the field of latching devices such as employed on farm tractor hitches or on large swinging gates, the essential or at least highly desirable performance characteristics of the device is that it becomes actuated only when desired, that it remain in a positively locked condition for as long as the latching function is required, that it can withstand substantial jostling without becoming either actuated or deactivated prematurely, and that it possesses structure which affords convenience of operation and use, particularly with respect to its employment on a tractor hitch wherein, typically, a single operator must properly locate and position the hitch components of the tractor and towed implement in as short a period of time as possible.

Many latch or hitch devices are known to the art such as those shown in U.S. Pat. Nos.: 5,080,386; 4,844,497; 4,560,183; 2,671,673; 4,998,745; 4,502,706; 3,495,851; 4,666,177; 2,556,748; 3,363,318, however, certain features provided by the present invention which markedly enhance its utility and which will become evident hereinafter, are absent from these prior devices.

Objects of the present invention are: to provide a hitch or latch type mechanism or device having enhanced performance characteristics which are particularly important to tractor operators on farms or the like; to provide such mechanism for use on gates, particularly such as used on farms or in industry; and especially to provide such mechanism which affords a high degree of visibility of the latching operation, particularly a view of the hitching operation from the back of a tractor as the operation is progressing.

SUMMARY OF THE INVENTION

These and other objects hereinafter appearing have been attained in accordance with the present invention through the discovery of a unique latching mechanism which, in its broad context is defined as comprising a stationary member having a first segment adapted to lie in a substantially horizontal plane, a second member movable with respect to said stationary member and having a second segment adapted to lie substantially in said plane, cylinder means having a bore and being affixed to said first segment with the lower end of said cylinder means spaced above said first segment to provide a latch gap, and with the axis of said bore oriented substantially normally to said horizontal plane, slot means formed through a wall section of said cylinder means and extending from an upper portion to a lower portion thereof, said portions being angularly offset at least about 20° around said cylinder means, bolt means slidably mounted in said bore and having a cam follower arm projecting through said slot means and slidable therealong and extending generally laterally outwardly from said cylinder means a substantial distance therefrom, land means provided at the upper portion of said wall section and forming a substantially horizontal component of the upper end of said slot means, power means contacting said bolt means for applying a force thereto tending to move the same downwardly in said bore means, aperture means in said second segment for slidably receiving a lower end of said bolt means, said second segment being dimensioned to slide into said latch gap, and camming means on said second member for engaging said cam follower arm as said second segment is moved into said latch gap, said engaging acting to move said arm off of said land and allowing said power means to force the lower end of said bolt means through said aperture means to pivotally connect said first and second members.

The invention will be further understood from the following drawings preferred embodiments thereof, wherein:

FIG. 1 is a partially cross-sectional view taken longitudinally of the latching device and an attached trailer tongue;

FIG. 2 is a partially cross-sectional view taken along line 2—2 of FIG. 1 in the direction of the arrows;

FIG. 3 top elevational view of the device of FIG. 1 wherein a trailer hitch tongue is inserted into the latch gap to the point where the follower arm is about to move off of the land means;

FIG. 4 is an end view of the device of FIG. 1 taken along line 4—4 thereof in the direction of the arrows; and FIG. 5 is a view similar to FIG. 3 but showing the present device mounted on a fence and gate.

DETAILED DESCRIPTION OF THE INVENTION

Referring to the drawings and with reference to the claims hereof, the present latching mechanism or device generally designated 10 comprises a stationary member 12 having a first segment 14 adapted to lie in a substantially horizontal plane, a second member movable with respect to said stationary member and having a second segment adapted to lie substantially in said plane, cylinder means 22 having a bore 24 and being affixed to said first segment with the lower end 26 of said cylinder means spaced above said first segment to provide a latch gap 28, and with the axis 30 of said bore oriented substantially normally to said horizontal plane, slot means 32 formed through a wall section 34 of said cylinder means and extending from an upper portion 36 of said section to a lower portion 38 thereof, said portions being angularly offset at least about 20° around said cylinder means 40, bolt means slidably mounted in said bore and having a cam follower arm 42 projecting through said slot means and slidable therealong and extending generally laterally outwardly from said cylinder means a substantial distance therefrom, land means 44 provided at the upper portion 36 of said wall section and forming a substantially horizontal component of the upper end of said slot means, power means 46 contacting said bolt means for applying a force thereto tending to move the same downwardly in said bore means, aperture means 48 in said second segment for slidably receiving the lower end 50 of said bolt means, said second segment being dimensioned to slide into said latch gap, and camming means 52 on said second member for engaging said cam follower arm 42 as said second segment is moved into said latch gap, said engaging acting to move said arm 42 off of said land 44 and allowing said power means to force the lower end of said bolt means through said aperture means to pivotally connect said first and second members.

In certain preferred embodiments of the invention:
 (a) a lead-in guide generally designated 54 is provided on said stationary member to assist in entering said second segment into said latch gap;
 (b) said bolt means is continuously urged by spring 46 toward its down position;
 (c) said latch gap, said bolt means, and said aperture means 48 in said second segment are dimensioned to allow considerable universal pivotal motion of said second member 18 to accommodate the relative motion of a tractor and trailer over uneven terrain; and
 (d) said camming means 52 is pivotally or hinge mounted on said second member to allow it to be retracted when not in use.

In the operation of the present latching mechanism or device with reference to its use for hitching a trailer or the like to a tractor for being towed, the tractor hitch member 12, with the bolt 2 cocked in its up position by means of arm 42 resting on land 44, is backed toward the trailer hitch member 18 whereby the lead-in guide 54 receives the leading end of member 18 and guides it toward latch gap 28. In concert with this relative movement of members 12 and 18, camming means or post 52 contacts arm 42 and starts to force it in an arc which begins to move its inner end 56 off of land 44. With the continued inward movement of member 18 toward latch gap 28, arm 42 falls off of land 44 and begins to slide along slot 32 and allows end 50 of the bolt to begin to enter aperture 48. The further movement of member 18 is stopped by shoulder means 58 affixed to member 12. At this point, bolt 40 has been forced all the way through aperture 48 in member 18 and through aperture means 60 in member 12 to pivotally lock members 12 and 18 together.

It is noted that arm 42 is preferably curved as shown such that a reasonable small distance of travel of member 18 toward latch gap 28 will effect the necessary forced arc travel of the arm by post 52 to move the arm off of land 44 at approximately the very moment that apertures 48 and 60 are aligned.

In a further preferred embodiment, the lower end 62 of slot 32 is also formed to provide a land 64 such that unwanted upward movement of bolt 40 by jostling of the latch components cannot occur such as otherwise might allow members 12 and 18 to become disconnected. It is noted that spring 46 should be sufficiently strong that movement of arm 42 upwardly through slot 32 by hand requires significant force. Also preferred, is the pivotal mounting generally designated 66 of post 52 to member 18 wherein a conventional type of overcentering link 68 may be provided to allow said post to be pivoted downwardly in an arc 70 when not in use as after the hitching or dehitching operation has been completed.

Referring to FIG. 5, member 12 is mounted in any manner on a gate post 72 of a fence 74 having, e.g., a hinged swinging gate 76 to which is affixed member 18. The swinging movement of the gate is in either direction of line "S". It is noted that in large, heavy swinging gates, the lead-in guide 54 can become quite helpful, especially as the hinging mechanisms become worn or loose.

The materials of construction of the present mechanism are preferably metal, although heavy plastic of polyester-fiberglass or cellulose acetate butyrate or the like may be employed.

The invention has been described in detail with particular reference to preferred embodiments thereof, but it will be understood that variations and modification will be effected within the spirit and scope of the invention.

I claim:

1. A latching mechanism comprising a stationary member having a first segment adapted to lie in a substantially horizontal plane, a second member movable with respect to said stationary member and having a second segment adapted to lie substantially in said plane, cylinder means having a bore for slidably receiving a bolt and being affixed to said first segment with the lower end of said cylinder means spaced above said first segment to provide a latch gap, and with the axis of said bore oriented substantially normally to said horizontal plane, bolt means for providing a latch pin and being slidably mounted in said bore and having a cam follower arm slot means formed through a wall section of said cylinder means and extending from an upper portion of said section to a lower portion thereof for slidably receiving and directing the motion of said cam follower arm, said cam follower arm projecting through said slot means and slidable therealong and extending generally laterally outwardly from said cylinder means a substantial distance therefrom, said upper and lower portions of said wall section being angularly offset at least about 20° around said cylinder means, first land means provided at the upper portion of said wall section and forming a substantially horizontal component of the upper end of said slot means, power means contacting said bolt means for applying a force thereto tending to move the same downwardly in said bore means, aperture means in said second segment for slidably receiving a lower end of said bolt means, said second segment being dimensioned to slide into said latch gap, and camming means on said second segment for engaging said cam follower arm, said camming means acting to move said arm of of said first land means and allowing said power means to force the lower end of said bolt means through said aperture means to pivotally connect said first and second embodiments as said second segment is moved into said latch gap.

2. The mechanism of claim 1 wherein a lead-in guide is provided on said stationary member for receiving said second segment and assisting in entering it into said latch gap.

3. The mechanism of claim 1 wherein said power means is a compression spring.

4. The mechanism of claim 1 wherein said latch gap, said bolt means, and said aperture means in said second segment are dimensioned to allow considerable universal pivotal motion of said second segment to accommodate the relative motion of a tractor and trailer over uneven terrain.

5. The mechanism of claim 1 wherein said camming means is pivotally mounted on said second segment to allow it to be retracted when not in use.

6. The mechanism of claim 1 further comprising second land means provided as the lower portion of said wall section and forming a substantially horizontal component of the lower end of said slot means for providing a positive blocking of inopportune upward motion of said cam follower arm in said slot means.

7. The mechanism of claim 1 providing the hitch for a tractor-trailer unit.

8. The mechanism of claim 1 providing the latch for a fence-gate unit.

* * * * *